United States Patent Office 3,756,830
Patented Sept. 4, 1973

3,756,830
FLUORINATED ALCOHOLS AS SOLVENTS FOR SPECTRAL SENSITIZING DYES
Richard Waack, Wayland, and Bernard Zuckerman, Framingham, Mass., assignors to Polaroid Coporation, Cambridge, Mass.
No Drawing. Filed Jan. 3, 1972, Ser. No. 215,099
Int. Cl. G03c 1/16
U.S. Cl. 96—132                11 Claims

ABSTRACT OF THE DISCLOSURE

Fluorinated lower alcohols are advantageously employed as solvents for photographic spectral sensitizing dyes thereby avoiding problems associated with the use of prior art solvents.

BACKGROUND OF THE INVENTION

Field of the invention

This invention relates to processes for spectrally sensitizing photographic silver halide emulsions and particularly to new processes for dissolving photographic spectral sensitizing dyes and incorporating these dyes into photographic silver halide emulsions.

Description of the prior art

It is well-known in the photographic art that most spectral sensitizing dyes for photosensitive materials are highly insoluble in water, yet are most advantageously incorporated in aqueous systems, such as dispersions of the photosensitive material in a hydrophilic binder such as gelatin. The majority of these special sensitizing dyes have thus been dissolved in a variety of organic solvents, notably the lower alcohols such as methanol and ethanol, before incorporation into the aqueous system; however, the use of these solvents has long been considered undesirable for a variety of reasons.

The relative insolubility of most of the spectral sensitizing dyes even in the organic solvents indicated above has required that relatively large quantities of solvent and/or elevated temperatures be employed in preparing sensitizing dye solutions possessing concentrations and solution stabilities suitable for commercial application. An aqueous colloidal system, such as a photographic gelatino-silver halide emulsion, may be deleteriously affected by the addition of such solvents, such as by causing a local dehydration or coacervation of the binder material resulting in particulate matter which cannot be readily redispersed. The resultant effects are colloidal instability and coating defects when the colloidal system is coated on a support. Furthermore, the hazards of fire and explosion associated with the use of large quantities of flammable organic solvents of the type indicated cause considerable concern in the art, not only because of the danger involved in their use, but also because of the manufacturing facilities required to store and dispense them.

The search for an alternate solvent with more desirable characteristics to replace the forementioned lower alcohols in the dissolution of spectral sensitizing dyes has been complicated by the exacting requirements of the photographic system in which the solutions are employed and few organic solvents have been found which could be considered totally acceptable. The materials exhibiting desirable dye solubility characteristics were found to be incompatible with other components in the system or photographically unacceptable, whereas those solvents meeting the latter requirements failed to possess the former. Alternate mechanical means of avoiding the aforesaid solvents, such as by dispersing spectral sensitizing dyes as solids in various hydrophilic colloids or dissolving said dyes by ultrasonics, are unattractive because of the expensive changes of equipment necessary with these techniques.

BRIEF SUMMARY OF THE INVENTION

A compatible and photographically acceptable organic solvent has now been found according to the present invention in which spectral sensitizing dyes are readily dissolved in relatively large amounts at room temperature, which does not cause coacervation of gelatin and its attendant problems, and which removes the hazards associated with prior art organic solvents. In one embodiment of the invention spectral sensitizing cyanine dyes are dissolved in a fluorinated lower alcohol, and the resultant solution is employed to spectrally sensitize a photographic emulsion. Alternatively, the fluorinated alcohol of the present invention may be advantageously employed in solvent mixtures such as, for example, with water, in varying proportions. In another embodiment, a novel spectral sensitizing dye composition is provided which possesses good stability and comprises a spectral sensitizing cyanine dye in solution with a fluorinated alcohol, or a solvent mixture thereof.

Accordingly, one object of the present invention is to provide an organic solvent for spectral sensitizing dyes which is compatible with aqueous photographic colloidal systems and is not hazardous to use or store. A further object is to provide a novel process for spectrally sensitizing photographic silver halide emulsions, particularly those emulsions containing gelatin as the binder material. A still further object is to provide a novel spectral sensitizing dye composition particularly suitable for employment with gelatino-silver halide photographic emulsions. Other objects of the invention will in part be obvious and will in part appear hereinafter.

The invention accordingly comprises the several steps and the relation and order of one or more of such steps with respect to each of the others, and the composition possessing the features, properties and the relation of elements which are exemplified in the following detailed disclosure, and the scope of the application of which will be indicated in the claims.

DETAILED DESCRIPTION OF THE INVENTION

As previously indicated, the present invention is directed to the employment of a fluorinated lower alcohol to dissolve spectral sensitizing dyes for ultimate incorporation into photosensitive silver halide emulsions.

As used herein and in the appended claims, the term spectral sensitizing dyes refers to compositions which extend the response of photosensitive materials to radiation to which the material normally is substantially insensitive. In general, the procedure of spectral sensitization of photosensitive material, and preferably sensitization of photosensitive silver halide, is accomplished by the adsorption onto one or more surfaces of the photosensitive material of one or more of the aforesaid spectral sensitizing dyes selected from certain classes of dyes including, preferably, cyanine dyes and dyes related to them. For an extensive treatment of cyanine dyes particularly adapted to provide spectral sensitization of, for example, a photosensitive silver halide crystal, see Hamer, F. M., The Cyanine Dyes and Related Compounds, Interscience Publishers, New York, N.Y., U.S.A. (1964); or, Mees, C. E. K., and James, T. H., The Theory of the Photographic Process, 3rd edition, the Macmillan Co., New York, N.Y., U.S.A. (1966), pp. 198–232.

As examples of cyanine dyes contemplated for employment in the practice of the present invention, mention may be made of cyanine dyes described in a multiplicity of U.S. and foreign patents including, for example, Brooker U.S. Pats. 1,846,301, issued Feb. 23, 1932; 1,846,302, issued Feb. 23, 1932; and 1,942,854, issued Jan. 9, 1934; White U.S. Pat. 1,990,507, issued Feb. 12, 1935; Brooker and White U.S. Pats. 2,112,140, issued Mar. 22, 1938; 2,165,338, issued July 11, 1939; 2,493,747, issued Jan. 10, 1950 and 2,739,964, issued Mar. 27, 1956; Brooker and Keyes U.S. Pat. 2,493,748, issued Jan. 10, 1950; Sprague U.S. Pats. 2,503,776, issued Apr. 11, 1950, and 2,519,001, issued Aug. 15, 1950; Heseltine and Brooker U.S. Pat. 2,666,761, issued Jan. 19, 1954; Heseltine U.S. Pat. 2,734,900, issued Feb. 14, 1956; Van Lare U.S. Pat. 2,739,149, issued Mar. 20, 1956; and Kodak Limited British Pat. 450,958, accepted July 15, 1936.

Generally, the cyanine dyes preferably employed for purposes of spectral sensitization comprise an amidinium ion system in which both of the nitrogen atoms are included within separate heterocyclic ring systems, and in which the conjugated chain joining the nitrogen atoms passes through a portion of each heterocyclic ring.

The above dyes are generally characterized by the following formula:

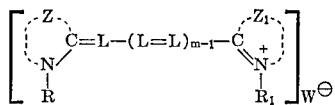

wherein L represents a methine group (e.g. —CH=, —C(CH$_3$)=, etc.), $m$ represents a positive integer of from 1 to 3; Z and Z$_1$ each represent the non-metallic atoms necessary to complete a heterocyclic nucleus containing from 5 to 6 atoms in the heterocyclic ring (e.g. thiazoline, thiazole, benzoxazole, benzothiazole, benzoselenazole, $\beta$-naphthothiazole, dimethylindolenine, 2- and 4-linked quinoline, 3-pyrrole, 3-indole, benzimidazole, etc.); R and R$_1$ each represent substituted or unsubstituted alkyl, alkylene, aryl, or aralkyl groups; and W$^\ominus$ represents an anion such as, for example, Cl$^\ominus$, Br$^\ominus$, I$^\ominus$, ClO$_4^\ominus$, HSO$_4^\ominus$, SO$_3$CH$^\ominus$, etc. This invention is particularly applicable to those cyanine dyes in which $m$ is 1 in the formula given supra, i.e. a 2,2'-monomethine cyanine dye.

The fluorinated lower alcohols contemplated for the practice of this invention are defined as hydroxylated aliphatic compounds containing from 2–5 carbon atoms in the hydrocarbon chain and preferably 2–3 carbon atoms, wherein one or more of the hydrogens on the hydrocarbon chain are replaced by a fluorine atom. References to methods of preparation for fluorinated alcohols of the type described above are available in the art such as, for example: Heszeldine, R. N.; Sharpe, A. G., Fluorine and Its Compounds, John Wiley & Sons, New York, N.Y. (1951), pp. 88–93; and, Simons, J. H., Fluorine Chemistry, Academic Press, Inc., New York, N.Y. (1950); vol. I, pp. 483–485; vol. II, pp. 229–232. Alternatively, the alcohols themselves are commercially available through a variety of chemical suppliers as indexed by Chemical Sources, Directories Publishing Co., Flemington, N.J. (1971). As examples of fluorinated alcohols within the scope of this invention mention may be made of the following:

2-fluoroethanol
2,2-difluoroethanol
2,2,2-trifluoroethanol
3-fluoro-1-propanol
3,3-difluoro-1-propanol
3,3,3-trifluoro-1-propanol
2-fluoro-1-propanol
3-fluoro-1-propanol
1-fluoro-2-propanol
2-fluoro-2-methyl-1-propanol
3-fluoro-2-methyl-1-propanol
1-fluoro-2-methyl-2-propanol
2,3-difluoro-1-propanol
1,3-difluoro-2-propanol
2,3-difluoro-1-propanol
1,1-difluoro-2-propanol
1,1-difluoro-2-methyl-2-propanol
1,3-difluoro-2-methyl-2-propanol
1,1,1-trifluoro-2-methyl-2-propanol
1,1,1,3-tetrafluoro-2-propanol
1,1,3,3-tetrafluoro-2-propanol
1,1,1-trifluoro-2-propanol
1,1,1,3,3,3-hexafluoro-2-methyl-2-propanol
1,1,1-trifluoro-1-butanol
1,1,1-trifluoro-2-butanol
1,1,1-trifluoro-2-pentanol
2,2,3,3,3-pentafluoro-1-propanol It is preferred that the alcohol selected from the group generally described above for employment according to the present invention contain more than one fluorine atom substituent on the hydrocarbon chain, and, most preferably, one or more trifluoro methyl groups (CF$_3$—). The substitution of the very electronegative fluorine for the hydrogen on a hydrocarbon chain greatly boosts the acidity of the functional —OH group attached thereto, which acidity increases as more of this substitution occurs. Similarly, the polarity of the molecule is greatly increased over analogous lower alcohols without said substitution. Without being bound by theory, it is believed that the increased solubility of spectral sensitizing cyanine dyes in the above-mentioned fluorinated lower alcohols, and the increased compatability of said alcohols with aqueous colloidal systems is due, at least in part, to the properties noted immediately above.

Accordingly, any of the above-indicated fluorinated alcohols are contemplated as suitable for the practice of the present invention. Preferably, the fluorinated lower alcohol selected is miscible with water and possesses a hydrocarbon chain of from 2–3 carbon atoms. Particularly preferred fluorinated alcohols of the above type possess one or more trifluoromethyl groups, such as for example, 2,2,2-trifluoroethanol or 1,1,1,3,3,3-hexafluoro-2-propanol, which have been found to be very compatible with gelatino-silver halide emulsions and are excellent solvents for spectral sensitizing dyes, as well as being essentially nonflammable.

The preferred silver halide dispersions employed in the practice of this invention may be prepared in known manner, for example, by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or, alternatively, employing any of the various flocc systems, or procedures, adapted to effect removal of undesired components, for example, the procedures described in U.S. Pats. Nos. 2,614,928; 2,614,929; 2,728,662; and the like; after-ripening the dispersion at an elevated temperature in combination with the addition of gelatin and/or such other polymeric materials as may be desired and various adjuncts, for example, chemical sensitizing agents and the like; all according to the traditional procedures of the art, as described in Neblette, C. B., Photography, Its Material and Processes, 6th ed., 1962.

Optical sensitization of the dispersion's silver halide crystals may then be accomplished by contact of the emulsion composition with an effective concentration of the selected cyanine optical sensitizing dye or dyes, each of which dyes has preferably been dissolved in an appropriate fluorinated alcohol as described in more detail hereinafter, all according to the traditional procedures set forth in the art such as, for example, the U.S. and foreign patents identified above. In general, the concentration of sensitizing dye or dyes may be varied empirically in accordance with the characteristics of the particular photoresponsive material such as the silver halide selected and the sensitizing effects desired which in the instance of preferred silver iodobromide dispersions will ordinarily fall within the range of about 0.05 to 5 grams of sensitizing dye per 100 grams of silver halide measured as silver.

Any further desired additives, such as coating aids and the like, may be incorporated in the emulsion and the mixture coated and processed according to the conventional procedures known in the photographic emulsion manufacturing art.

Alternatively, an emulsion coating can be prepared and coated on a suitable support whereupon the coating may be sequentially immersed in, or otherwise treated with, the respective solutions of cyanine dyes.

Specifically, a gelatino-silver iododbromide emulsion prepared comprising a gelatin/silver ratio of about 1:1 and about 4 mole percent bromide concentration may be chemically sensitized with gold and sulfur, as, for example by the addition, at about 56° C., pH 5 and pAg 9, of an optimally sensitizing amount of a solution comprising 0.1 gram of ammonium thiocyanate in 9.9 cc. of water and 1.2 cc. of a solution containing 0.097 gram of gold chloride in 9.9 cc. of water, and 0.02% aqueous sodium thiosulfate solution.

The formulation may be spectrally sensitized in accordance with the present invention by the addition of one or more of the cyanine spectral sensitizing dyes detailed above dissolved in a fluorinated alcohol at room temperature with slight agitation at a solution concentration of, for example, 5 mgs./ml. or more, as performed in accordance with procedures used with conventional solvents such as methanol. Solutions of the above-mentioned type exhibit good stability, showing insignificant decreases in accordance over the periods of time required for practical commercial application such as, for example, an eight day period or longer prior to coating.

It may be advisable, due to the relatively high cost of the fluorinated lower alcohols described herein when compared to their analogous unfluorinated counterparts, to effect dissolution of the spectral sensitizing dye with a mixture of the above-identified fluorinated lower alcohol and water; using as much water as the solubility of the particular sensitizing dye will permit.

The spectrally sensitized formulation may then be coated on an appropriate support as, for example, cellulose triacetate film base and the film units thus prepared exposed in a conventional wedge spectrograph.

Upon processing with a photographic developing composition such as, for example, a conventional processing composition of the type commercially distributed by Eastman Kodak Company, Rochester, N.Y., U.S.A., under the trade name of "Dektol Developer" and comprising an aqueous alkaline solution of monomethyl-para-amino phenol sulfate and hydroquinone, and a conventional acid stop bath, the resultant spectrograms will detail the sensitivity characteristics of the optically sensitized formulation.

As the binder for photosensitive crystals, the aforementioned gelatin may be, in whole or in part, replaced with some other colloidal material such as albumin, casein; or zein; or resins such as cellulose derivatives and vinyl polymers such as described in an extensive multiplicity of U.S. and foreign patents.

The photographic emulsions may be employed in black-and-white or color photographic systems, of both the additive and subtractive types, for example, those described in Photography, Its Materials and Processes, supra. The photoresponsive crystals may be employed in the fabrication of photographic emulsions which form latent images predominantly on the surface of the crystal or in emulsions which form latent images predominantly inside the crystal such as those described in U.S. Pat. No. 2,592,250.

The fabricated emulsions may also be employed in silver diffusion transfer processes of the types set forth in for example, U.S. Pats. Nos. 2,500,421; 2,543,181; 2,565,376; 2,962,377; 3,003,875; and 3,113,866; in additive color diffusion transfer processes of the type disclosed, for example in U.S. Pats. Nos. 2,614,926; 2,726,154; 2,944,894; 2,992,103 and 3,087,815; and in subtractive color diffusion transfer processes of the types disclosed in U.S. Pats. Nos. 2,774,668; 2,802,735; 2,968,554; 2,983,606; 3,019,104; 3,039,869; 3,345,163; etc.

The photoresponsive crystals of the present invention may also be employed as the photosensitive component of information recording elements which employ the distribution of a dispersion of relatively discrete photoresponsive crystal, substantially free from interstitial binding agents, on a supporting member such as those previously designated, to provide image recording elements, for example, as described in U.S. Pats. Nos. 2,945,771; 3,142,566; 3,142,567; Newman, Comment on Non-Gelatin Film, B.J.O.P., 534, Sept. 15, 1961; and Belgian Pats. Nos. 642,557 and 642,558.

As taught in the art, the concentration of silver halide crystals forming a photographic emulsion and the relative structural parameters of the emulsion layer, for example, the relative thickness, and the like, may be varied extensively and drastically, depending upon the specific photographic system and the ultimate employment of the selected photographic system.

A specific example, set forth for purposes of further detailed illustration of the advantageous replacement of a prior art solvent with a fluorinated lower alcohol in the dissolution of spectral sensitizing dyes for a photographic system, is as follows:

A gelatino-silver iodobromide emulsion having a weight-weight concentration of 229 mg. of silver/g. of emulsion was prepared as outlined above and divided into two 15 gram portions, identified as test portion and control portion. Each portion was spectrally sensitized to the green region of the visible spectrum as follows:

(a) 0.75 gm. of Dye I, 3-carboxymethyl-1'-ethyl-thia-2'-cyanine betaine were dissolved in 250 ml. of a solvent mixture of 50% methanol/50% water, with agitation at room temperature, to provide Solution IA having a Dye I concentration of 3.0 mg./ml. Following a similar procedure, 1.125 gms. of Dye I were readily dissolved in 250 ml. of 100% 2,2,2-trifluoroethanol to provide Solution IB having a Dye I concentration of 4.50 mg./ml.

(b) 0.5 gm. of Dye II, 3-carboxymethyl-1'-ethyl-5,6'-dimethoxythia-2'-cyanine betaine were dissolved in 250 ml. of 100% methanol to provide Solution IIA with a Dye II concentration of 2.0 mg./ml., and 1.187 gms. of Dye II were dissolved in 250 mls. of 100% 2,2,2-trifluoroethanol to provide Solution IIB with a Dye II concentration of 4.75 mg./ml.

(c) 0.45 ml. of Solution IA were added to the melted control portion of the emulsion with stirring at 40° C., to form a silver emulsion mixture having a concentration of 0.4 mg. Dye I/gm. of silver. Approximately one minute later, 1.4 mls. of Solution IIA were added to the above mixture. The resultant mixture had, in addition to the above concentration of Dye I, a concentration of 0.8 mg. Dye II/g. of silver. This mixture was stirred about 20 minutes. Then, 143.6 ml. of a coating solution comprising 8% gelatin, 12% surfactant (Aerosol OT–75% from American Cyanamid) and 80% water was added to the above mixture to provide a final volume of 156 ml. having a silver concentration of 22 mg./ml.

(d) 0.38 ml. of Solution IB were added to the melted test portion of the emulsion with stirring at 40° C., to form an emulsion mixture having a concentration of 0.4 mg. Dye I/gm. of silver, similar to that formed in (c) above. Then, one minute later, 0.57 ml. of Solution IIB were added to this mixture to form an emulsion mixture having, in addition to the Dye I concentration, a concentration of 0.8 mg. of Dye II/gm. of silver, again analogous to (c) above. 144.5 mls. of the above-identified coating solution were added to this mixture, also resulting in a final volume of 156 ml. and a silver concentration of 22 mg./ml.

Accordingly, test and control portions of spectrally sensitized emulsion were provided by the procedure detailed above, which portions differed only in the solvents used for the dissolution of the particular spectral sensitizing dye employed. Before the addition of Dye I and II to each portion of the emulsion, 0.85 ml. of an aqueous dispersion of 5,5′,6,6′-tetrachloro-1,1′-diethyl-3,3′-bis-(γ-sulfopropyl) benzimidazolocarbocyanine dye at a concentration of 2 mg. dye/ml. of solution were also added to both test and control portions of the silver emulsion to extend the spectral response thereof.

The resultant sensitized emulsions were then coated immediately on the external surface of a magenta dye-developer layer containing 50 mg./ft.$^2$ of the 1:1 chrom complexed azo dye represented by the formula:

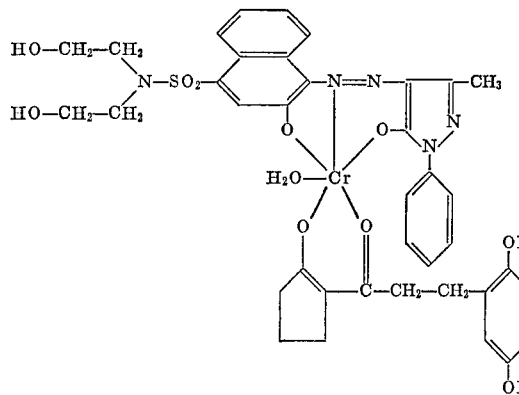

which had previously been coated on a cellulose triacetate film base. The coatings were accomplished by using a No. 18 coating rod which produced a coverage of 66 mgs. of silver/ft.$^2$. The resultant image dye to silver ratio on a weight-weight basis was therefore about 1:1.3. Both coatings dried readily with no appearance of coacervation of gelatin or other compatability problems.

Sections of the resultant monochromes were exposed to a conventional wedge spectrogram and others to a filtered Xenon light source operating at approximately 5500° K. and emitting 2 mcs. through a continuous step wedge in an intensity scale sensitometer further modified with a Wratten Number 12 filter.

The exposed monochromes were processed in the dark in combination with a transparent polyethylene terephthalate based receiving element having coated thereon a polymeric acid neutralizing layer, a spacer or timing layer and a poly-4-vinyl pyridine/polyvinyl alcohol image receiving layer coated on one surface thereof as described for example, in U.S. Patent No. 3,362,819, particularly with respect to Example 11 therein, and then retained in the dark for ten minutes thereafter. A processing composition was employed comprising:

| | Gms. |
|---|---|
| Potassium hydroxide | 11.2 |
| Hydroxyethyl cellulose | 3.4 |
| N-phenethyl-α-picolinium bromide | 2.7 |
| Benzothiazole | 1.15 |
| Titanium dioxide | 50.0 |
| 4′-methylphenylhydroquinone | 0.6 |
| Water: 100 cc. | |

The resultant wedge spectrograms for the test portion were almost indistinguishable from those for the control portion. Analysis of H and D curves from step wedge exposures to green light for both test and control portions showed that the substitution of the fluorinated alcohol gave no adverse sensitometric effects:

| | Processing after storage for 24 hours at room temperature and 45% R.H. | | Accelerated aging test, i.e. processing at R.T and 45% R.H. after storage for 6 days at 120° F. in a foil bag | |
|---|---|---|---|---|
| | Control | Test | Control | Test |
| $D_{max}$ | 2.13 | 2.11 | 1.81 | 1.95 |
| $D_{min}$ | 0.26 | 0.24 | 0.23 | 0.23 |
| Log E at 0.6 transfer image reflection density | 0.87 | 0.87 | 1.22 | 1.16 |

Since certain changes may be made in the above process and composition without departing from the scope of the invention herein involved, it is intended that all matter contained in the above description shall be interpreted as illustrative and not in a limiting sense.

What is claimed is:

1. A process for imparting spectral sensitivity to photosensitive silver halide which comprises:
   dissolving a spectral sensitizing cyanine dye in a fluorinated lower alcohol to form a sensitizing dye solution; and
   contacting said silver halide with said sensitizing dye solution to spectrally sensitize said silver halide.

2. A process as defined in claim 1, wherein said fluorinated lower alcohol contains a trifluoromethyl group.

3. A process as described in claim 2, wherein said fluorinated lower alcohol is selected from the group consisting of 2,2,2-trifluoroethanol and 1,1,1,3,3,3-hexafluoro-2-propanol.

4. A process as described in claim 1 wherein said cyanine dye is a simple 2,2′-monomethine cyanine dye.

5. A process as defined in claim 1 wherein said photosensitive silver halide is dispersed in gelatin.

6. A process as defined in claim 1 further comprising the step of mixing said fluorinated lower alcohol with water to form a mixed solvent system prior to dissolving said cyanine dye therein.

7. A composition for the spectral sensitization of photosensitive silver halide which comprises:
   a fluorinated lower alcohol; and
   a spectral sensitizing cyanine dye dissolved in said fluorinated lower alcohol to form a solution thereof.

8. A composition as described in claim 7 wherein said fluorinated lower alcohol contains a trifluoromethyl group.

9. A composition as defined in claim 8 wherein said fluorinated lower alcohol is selected from the group consisting of 2,2,2-trifluoroethanol and 1,1,1,3,3,3-hexafluoro-2-propanol.

10. A composition as described in claim 7 wherein said cyanine dye is a 2,2′-monomethine cyanine dye.

11. A composition as described in claim 7 wherein said composition further comprises water.

References Cited
UNITED STATES PATENTS

| 3,469,987 | 9/1969 | Owens et al. | 96—130 |
| 3,622,316 | 11/1971 | Bird et al. | 96—124 |
| 3,658,546 | 4/1972 | Van Doorselaer et al. | 96—130 |
| 3,660,101 | 5/1972 | Owens et al. | 96—130 |
| 3,676,147 | 7/1972 | Boyer et al. | 96—132 |

J. TRAVIS BROWN, Primary Examiner

U.S. Cl. X.R.

96—29 D, 130, 131, 132, 134, 137